US 6,253,331 B1

(12) United States Patent
Kotani (10) Patent No.: US 6,253,331 B1
(45) Date of Patent: Jun. 26, 2001

(54) TIMER APPARATUS AND COMPUTER

(75) Inventor: Seigo Kotani, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/126,225

(22) Filed: Jul. 30, 1998

(30) Foreign Application Priority Data

Mar. 3, 1998 (JP) .................................................. 10-051062

(51) Int. Cl.[7] ........................................................ G06F 1/12
(52) U.S. Cl. .......................... 713/400; 713/194; 713/500; 713/503; 713/600; 713/178
(58) Field of Search ................................... 713/194, 400, 713/500, 503, 600, 178

(56) References Cited

U.S. PATENT DOCUMENTS

| | | | |
|---|---|---|---|
| 5,001,752 | 3/1991 | Fischer . | |
| 5,189,700 | * 2/1993 | Blandford | 713/178 |
| 5,347,580 | * 9/1994 | Molva et al. | 713/159 |
| 5,422,953 | * 6/1995 | Fischer | 713/172 |
| 5,493,613 | * 2/1996 | Deno et al. | 705/73 |
| 5,936,149 | * 8/1999 | Fischer | 73/1.43 |

* cited by examiner

*Primary Examiner*—Tod Swann
*Assistant Examiner*—Ronald Sulpizio
(74) *Attorney, Agent, or Firm*—Staas & Halsey LLP (57) ABSTRACT

A timer apparatus having a power source, a timer unit for outputting time information to which a time is set via a setting terminal, and a control unit in which a program for permitting set of a time in the timer unit only once is written from the outside via a write terminal and which controls the timer unit. After the program is written to the control unit via the write terminal, the write terminal is disconnected, and the power source, timer unit and control unit are molded integrally. A low-cost timer apparatus in which a time cannot be changed incorrectly can be realized without mounting a processor for performing a complicated process.

28 Claims, 9 Drawing Sheets

TIMER APPARATUS AND COMPUTER

BACKGROUND OF THE INVENTION

The present invention relates to a timer apparatus which is arranged so that a power source, a timer unit for outputting time information and a control unit for controlling the timer unit are molded, and a time can be changed, and relates to a computer having such the timer apparatus.

In a system utilizing a computer such as a remittance system and electronic filing document transmission system, since an outputted time occasionally has important meaning, it is desired that the computer is provided with a timer apparatus in which a time is not changed incorrectly.

As a technique for preventing an incorrect change of a time in a timer apparatus, U.S. Pat. No. 5,001,752 discloses a digital time authentication apparatus in which a whole apparatus is fixed integrally by an epoxy resin and a switch is provided so as to be embedded into the epoxy resin and when the switch is turned on, the apparatus is exploded by a physical destruction activity, or a digital time authentication apparatus which performs signature communication and encryption communication in order to make it difficult to change software from an input terminal.

However, in the digital time authentication apparatus in which the switch is provided so as to be embedded into the epoxy resin, an input terminal can be dug out by X-raying so that the switch is not turned on, and in the digital time authentication apparatus which performs signature communication and encryption communication, a skilled cracker can find signature and cipher key.

BRIEF SUMMARY OF THE INVENTION

The present invention is devised from the view of the above situation, in first through sixth aspects, it is an object of the present invention to provide a low-cost timer apparatus in which it is not necessary to use a physical self-explosion apparatus and to mount a processor for executing complicated processes, and a time is not changed incorrectly.

In the seventh and eleventh aspects, it is an object of the present invention to provide a low-cost timer apparatus which can prevent an incorrect change in time due to operating and exchanging a power source.

In the eighth through tenth aspects, it is an object of the present invention to provide a low-cost timer apparatus which can improve reliability of printed time.

In the twelfth aspect, it is an object of the present invention to provide a computer having a low-cost timer apparatus in which a timer is not changed incorrectly without using a physical self-explosion apparatus and without mounting a processor for executing a complicated process.

The timer apparatus of the present invention basically has a power source, a timer unit for outputting time information to which a time is set via a setting terminal, and a control unit for controlling the timer unit in which a program is written from the outside via a write terminal, and they are molded integrally.

In the timer apparatus according to the first aspect, after a program for permitting set of a time in the timer unit is written to the control unit via the write terminal, the write terminal is disconnected, the power source, timer unit and control unit are molded integrally.

In the timer apparatus of the first aspect, after a time is once set via the setting terminal, the control unit prohibits set of a time according to the program, but since the write terminal for changing the program has been disconnected, it is impossible to change the program. As a result, a low-cost timer apparatus in which a time is not changed incorrectly can be realized without using a physical self-explosion apparatus and without mounting a processor for performing a complicated processor.

The timer apparatus according to the second aspect is arranged so that the control unit includes a portion formed as a temperature fuse of the write terminal and heating means in the vicinity of the temperature fuse, and after the program for permitting set of a time in the timer unit only once is written to the control unit via the write terminal, the temperature fuse is fused by the heating means, and the power source, timer unit and control unit are molded integrally.

In the timer apparatus of the second aspect, after a time is once set via the setting terminal, the control unit prohibits set of a time according to the program, but since the write terminal for changing the program has been fused, it is impossible to change the program. As a result, a low-cost timer apparatus in which a time is not change incorrectly can be realized without using a physical self-explosion apparatus and without mounting a processor for performing a complicated process.

The timer apparatus according to the third aspect is arranged so that after a program for permitting set of a time in the timer unit only once is written to the control unit via a write terminal, the write terminal is disconnected and after a time is set via a setting terminal, the setting terminal is disconnected, and a power source, timer unit and control unit are molded integrally.

In the timer apparatus of the third aspect, after the program is written from the outside to the control unit via the write terminal, the write terminal is disconnected. Then, after a time is set via the setting terminal, the setting terminal is disconnected, and the power source, timer unit and control unit are molded integrally. In this state, since the setting terminal for changing a time has been disconnected, the time cannot be changed. As a result, a low-cost timer apparatus in which a time is not changed incorrectly can be realized without using a physical self-explosion apparatus and without mounting a processor for performing a complicated process.

The timer apparatus according to the fourth aspect has a portion formed as a temperature fuse of the write terminal inside the control unit, first heating means in the vicinity of the temperature fuse, a portion formed as a temperature fuse of the setting terminal inside the timer unit and second heating means in the vicinity of the temperature fuse. After a program for permitting set of a time in the timer unit only once is written to the control unit via the write terminal, the temperature fuse of the write terminal is fused by the first heating means, and after a time is set via the setting terminal, the temperature fuse of the setting terminal is fused, and the power source, timer unit and control unit are molded integrally.

In the timer apparatus of the fourth aspect, after the program is written from the outside to the control unit via the write terminal, the portion formed as the temperature fuse of the write terminal is fused by the first heating means. Moreover, after a time is set via the setting terminal, the portion formed as the temperature fuse of the setting terminal is fused. Thereafter, the power source, timer unit and control unit are molded integrally. In this state, the program cannot be changed and a time cannot be changed. As a result, a low-cost timer apparatus in which a time is not changed incorrectly can be realized without using a physical self-explosion apparatus and without mounting a processor for performing a complicated process.

The timer apparatus according to the fifth aspect has a portion formed as a temperature fuse of the write terminal inside the control unit and heating means in the vicinity of the temperature fuse, and a power source, timer unit and control unit are molded integrally. A program for permitting set of a time in the timer unit only once is written to the control unit via the write terminal.

In the timer apparatus of the fifth aspect, when after the program, which includes means for prohibiting set of a time and to which a time is once set via the setting terminal, is written from the outside to the control unit via the write terminal, the temperature fuse is fused by the heating means, the write terminal for changing the program is fused, so the program cannot be changed. As a result, a low-cost timer apparatus in which a time is not changed incorrectly can be realized without using a physical self-explosion apparatus and without mounting a processor for performing a complicated process.

The timer apparatus according to the sixth aspect has a portion formed as a temperature fuse of a write terminal inside the control unit and first heating means in the vicinity of the temperature fuse and has a portion formed as a temperature fuse of a setting terminal inside the timer unit and second heating means in the vicinity of the temperature fuse, and a power source, timer unit and control unit are molded integrally.

In the timer apparatus of the sixth aspect, after a program is written from the outside to the control unit via the write terminal, the portion formed as the temperature fuse of the write terminal is fused by the first heating means, and after a time is set via the setting terminal, the portion formed as the temperature fuse of the setting terminal is fused. As a result, the program cannot be changed. Moreover, since the setting terminal for changing a time is fused in its inner portion, the time cannot be changed. As a result, a low-cost timer apparatus in which a time is not changed incorrectly can be realized without using a physical self-explosion apparatus and without mounting a processor for performing a complicated process.

The timer apparatus according to the seventh aspect is provided to the first through sixth aspects with predicting means for predicting a prediction term of validity based on the power source at the time of starting or setting a time, calculating means for calculating a residual term of the prediction term of validity predicted by the predicting means, and means for outputting the residual term calculated by the calculating means.

In the timer apparatus of the seventh aspect, since the residual term of validity of the power source is detected easily, in the case the power source and the main body of the timer apparatus are molded integrally, the timer apparatus can be exchanged for a new one securely. Therefore, incorrect change in a time due to operating and exchanging of the power source can be prevented.

The timer apparatus according to the eighth aspect further has judging means for judging as to whether or not a password inputted from the outside is correct, and in the case where the judging means judges that the password is correct, the time information is outputted from the timer unit.

In the timer apparatus of the eighth aspect, only in the case where the password inputted from the outside is correct, the time information is outputted. Therefore, the time information includes ID of the timer apparatus so as to be outputted, and the time as well as the ID are printed. As a result, reliability of the printed time can be improved.

The timer apparatus according to the ninth aspect further has means for generating a password according to an instruction from the outside, means for outputting the generated password, and judging means for when a password is inputted from the outside, judging as to whether or not the inputted password coincides with the formerly outputted password. When both the passwords coincide with each other, the time information is outputted from the timer unit.

In the timer apparatus of the ninth aspect, in the case where the password, which is generated and outputted by the timer apparatus, coincides with a password inputted from the outside, the time information is outputted from the timer unit. As a result, since it is not necessary to fix a password, a password is not copied. Therefore, the time information in which ID of the timer apparatus is included is outputted, and the time as well as the ID are printed. As a result, reliability of the printed time can be improved.

The timer apparatus according to the tenth aspect further has encrypting means for encrypting the time information outputted from the timer unit so as to output it.

In the timer apparatus of the tenth aspect, since the time information outputted from the timer unit is encrypted to be outputted, the timer information includes ID of the timer apparatus to be outputted, and the time as well as the ID are printed. As a result, reliability of the printed time is improved.

The timer apparatus according to the eleventh aspect further has voltage detecting means for detecting a voltage of the power source, comparing means for comparing a value of the voltage detected by the voltage detecting means with a predetermined value, and means for when the value of the voltage is smaller than the predetermined value as a result of the comparison, warning that the term of validity is short.

In the timer apparatus of the seventh aspect, since the residual term of validity of the power source is detected easily, in the case where the power source and the main body of the timer apparatus are molded integrally, the timer apparatus can be exchanged for a new one securely. For this reason, incorrect change in a time due to operating and exchanging of the power source can be prevented.

In the timer apparatus of the eleventh aspect, in the case where the value of the voltage of the power source is smaller than the predetermined value, a warning is given the term of validity of the power source is short. For this reason, in the case where the power source and the main body of the timer apparatus are molded integrally, the timer apparatus can be exchanged for a new one securely. Therefore, incorrect change in a time due to operating and exchanging of the power source can be prevented.

The computer of the present invention has one of the timer apparatuses according to the respective aspects.

In the computer, an outputted time cannot be changed incorrectly.

The above and further objects and features of the invention will more fully be apparent from the following detailed description with accompanying drawings.

DESCRIPTION OF THE PREFERRED EMBODIMENTS

Figure 1:
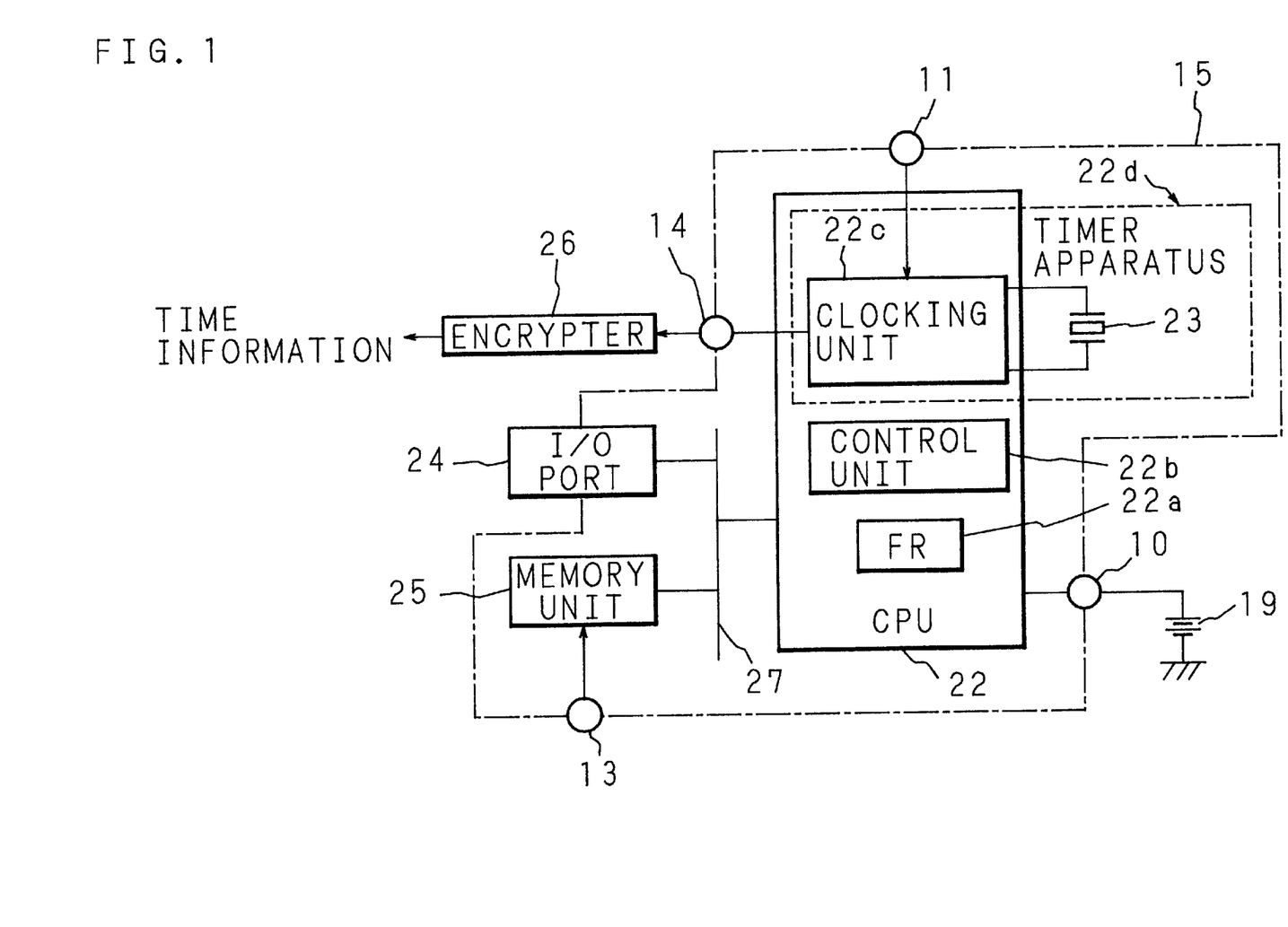
FIG. 1 is a block diagram showing an arrangement of an essential portion of a timer apparatus according to an embodiment of the present invention.

The following describes embodiments of the present invention on reference to the drawings. FIG. 1 is a block diagram showing the arrangement of an essential portion of the timer apparatus according to the present invention.

In this timer apparatus, a portion arranged as a timer IC 15, mentioned later, is connected with a battery (power source) 19 and an encrypter 26. Here, the battery 19 is connected with the timer IC 15 by a power source terminal 10.

The timer IC 15 includes a CPU 22, a crystal oscillator 23, an I/O port 24 and a memory unit 25. The CPU 22 includes a clocking unit 22c, a control unit 22b and a flag register 22a.

The crystal oscillator 23 generates a pulse signal to be clocking reference and supplies it to the clocking unit 22c. The clocking unit 22c divides the pulse signal supplied from the crystal oscillator 23 and generates time information so as to output it. The crystal oscillator 23 and clocking unit 22c compose the clocking unit 22c. The control unit 22b controls a timer unit 22d.

The encrypter 26 is connected with the clocking unit 22c by a time reading-out terminal 14, and encrypts the time information directly supplied from the clocking unit 22c so as to output it.

The I/O port 24 and memory unit 25 are connected with the CPU 22 by a bus 27. The memory unit 25 includes a non-volatile memory (for example, flash ROM) for storing a program of the CPU 22, and has a flash ROM write terminal 13 for writing the program. The I/O port 24 is used for communication with the CPU 22, in other words, the outside of the timer IC 15.

Figure 2A:
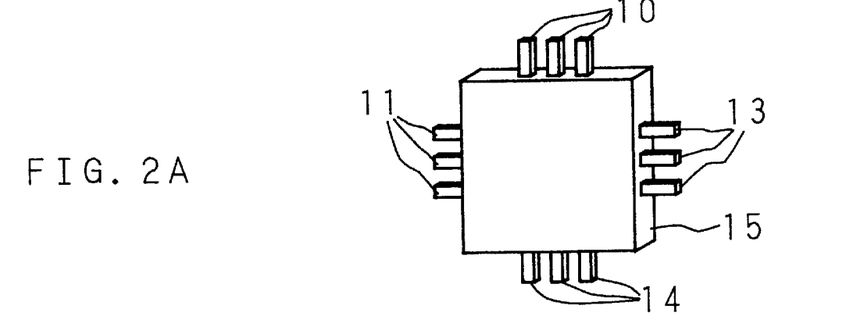
FIG. 2A through FIG. 2E are drawings explaining manufacturing process of the timer apparatus according to the present invention.

FIG. 2A through FIG. 2D are explanatory drawings for explaining the manufacturing process of the timer apparatus having such an arrangement. As shown in FIG. 2A, in the manufacturing process, the crystal oscillator 23, CPU 22, I/O port 24 and memory unit 25 are formed in one timer IC 15. The power source terminal 10, a time setting terminal 11, the time reading-out terminal 14 and the flash ROM write terminal 13 are exposed around the timer IC 15.

Figure 2B:
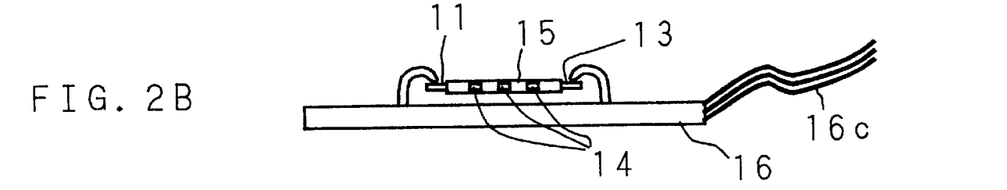

Next, as shown in FIG. 2B, the timer IC 15 is set in a ROM writer 16 having a socket for the flash ROM of the memory unit 25, and a program for the CPU 22 is written in the flash ROM from the flash ROM write terminal 13. At this time, since the battery 19 is not connected yet, a power source as well as various signals are supplied from the ROM writer 16 via a cable 16c. The program to be written in the flash ROM includes a process such that "when a clocking operation is started from a set time via the time setting terminal and once the time is set, resetting thereafter is not acceptable".

Figure 2C:
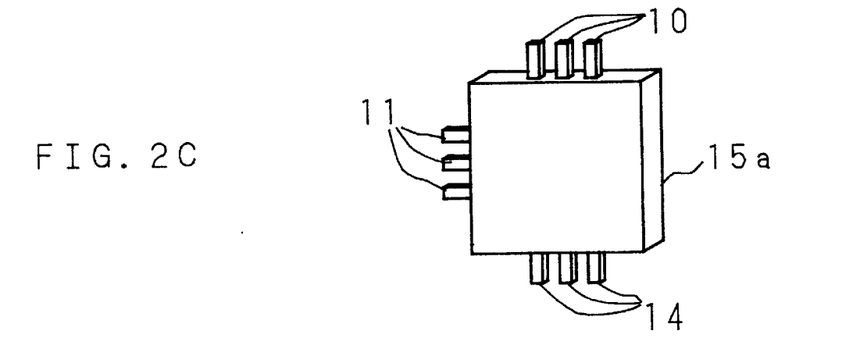

Next, as shown in FIG. 2C, the flash ROM write terminal 13 is disconnected.

Figure 2D:
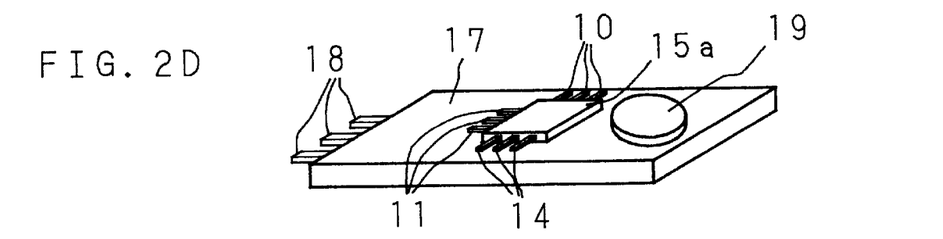

As shown in FIG. 2D, a timer IC 15a, which is disconnected with the flash ROM write terminal 13 from the timer IC 15, is connected with the battery 19, encrypter 26, etc. by soldering with the power source terminal 10, time setting terminal 11, time reading-out terminal 14, and a timer module terminal 18 are mounted onto a timer module 17. Thereafter, the whole is molded integrally by epoxy resin. In this state, a time is set in the clocking unit 22c from the timer module terminal 18 via the time setting terminal 11, and the product is shipped from the factory (first aspect).

Figure 2E:
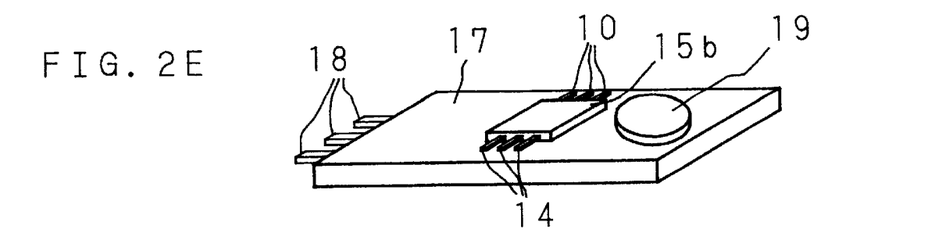

Here, as the third aspect, the following method may be used. The timer IC 15a, which is disconnected from the flash ROM write terminal 13, battery 19, encrypter 26, etc. are mounted onto the timer module 17 by soldering, a time is set from the time setting terminal 11. Thereafter, as shown in FIG. 2E, a timer IC 15b is made from the timer IC 15 by disconnecting the time setting terminal 11, and the whole is molded integrally by the epoxy resin.

Figure 3A:
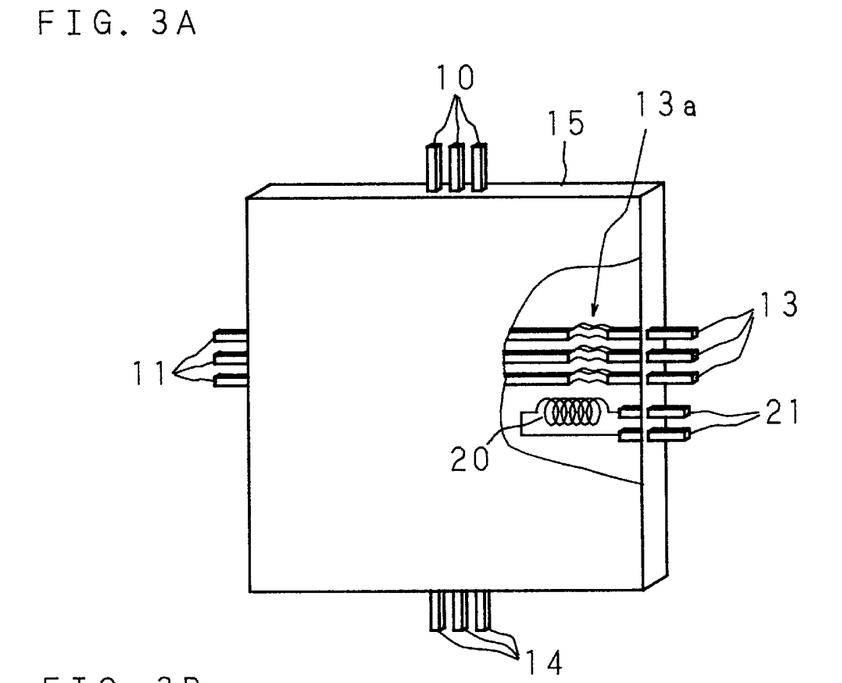
FIG. 3A and FIG. 3B are drawings explaining another manufacturing process of the timer apparatus according to the present invention.

In addition, instead of disconnecting the flash ROM write terminal 13, as shown in FIG. 3A, the following arrangement can be adopted. A portion 13a formed as a temperature fuse is provided to the flash ROM write terminal 13 in the timer IC 15, and a heater circuit 20 is provided to the vicinity of the portion 13a. In such an arrangement, after the program for the CPU 22 is written from the flash ROM write terminal 13 into the flash ROM, an electric current is applied from a heater circuit terminal 21, and the portion 13a formed as the temperature fuse is fused by a heat generated by the electric current (second aspect).

In addition, the product is shipped from the factory with the portion 13a formed as the temperature fuse not being fused, and the portion 13a formed as the temperature fuse can be fused as the need arises (fifth aspect).

Figure 3B:
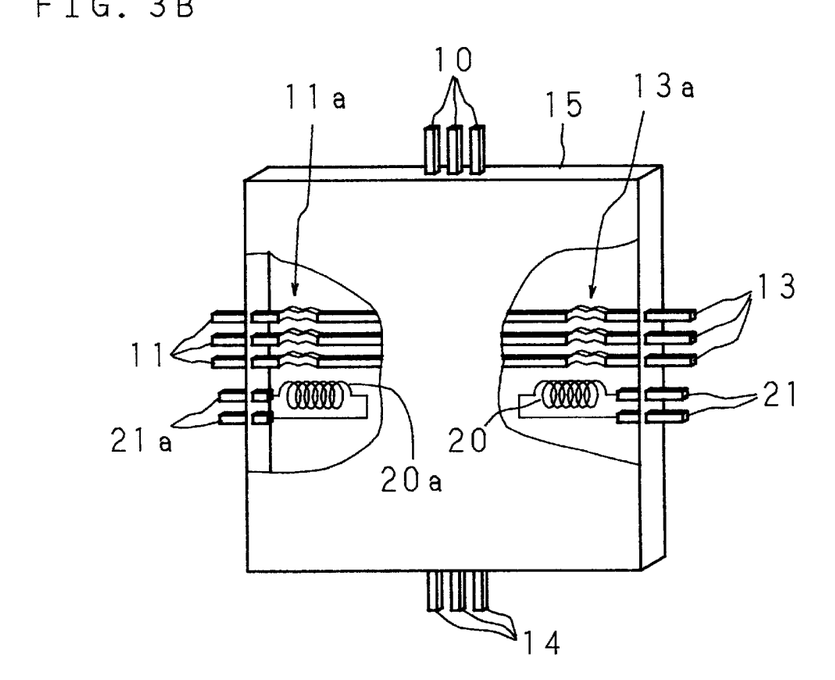

Furthermore, as the fourth aspect, as shown in FIG. 3B, a portion 11a formed as a temperature fuse is provided to the time setting terminal 11 in the timer IC 15, and a heater circuit 20a having a terminal 21a is provided to its vicinity. After the flash ROM write terminal 13 is fused, the timer IC 15a, battery 19, encrypter 26, etc. are mounted onto the timer module 17 by soldering. In this state, a time is set from the time setting terminal 11, an electric current is applied from the heater circuit terminal 21a, and after the portion 11a formed as the temperature fuse of the time setting terminal 11 is fused by a heat generated by the electric current, the whole is molded integrally by the epoxy resin.

Moreover, the product is shipped from the factory with the flash ROM write terminal 13 and the portion 11a formed as the temperature fuse of the time setting terminal 11 not being fused, and the portion 11a formed as the temperature fuse is fused as the need arises (sixth aspect).

In these cases, the portions 11a and 13a formed as the temperature fuse may be provided to a wiring in a silicon chip or a lead wire in a package to which the chip is mounted. In the case where they are provided to the former, since disconnection is made on a more minute portion, incorrect activities using a probe or the like become difficult, but it has a disadvantage such that a cost of chip rises. In the case where they are provided to the lead wire, the apparatus can be manufactured at a lower cost, but it has disadvantages such that a lot of power is required for fusing the lead wire and incorrect activities using a probe or the like become comparatively easy.

The following describes an operation of the timer apparatus manufactured in such a manner on reference to the flow charts in FIG. 4 through FIG. 7.

Figure 4:
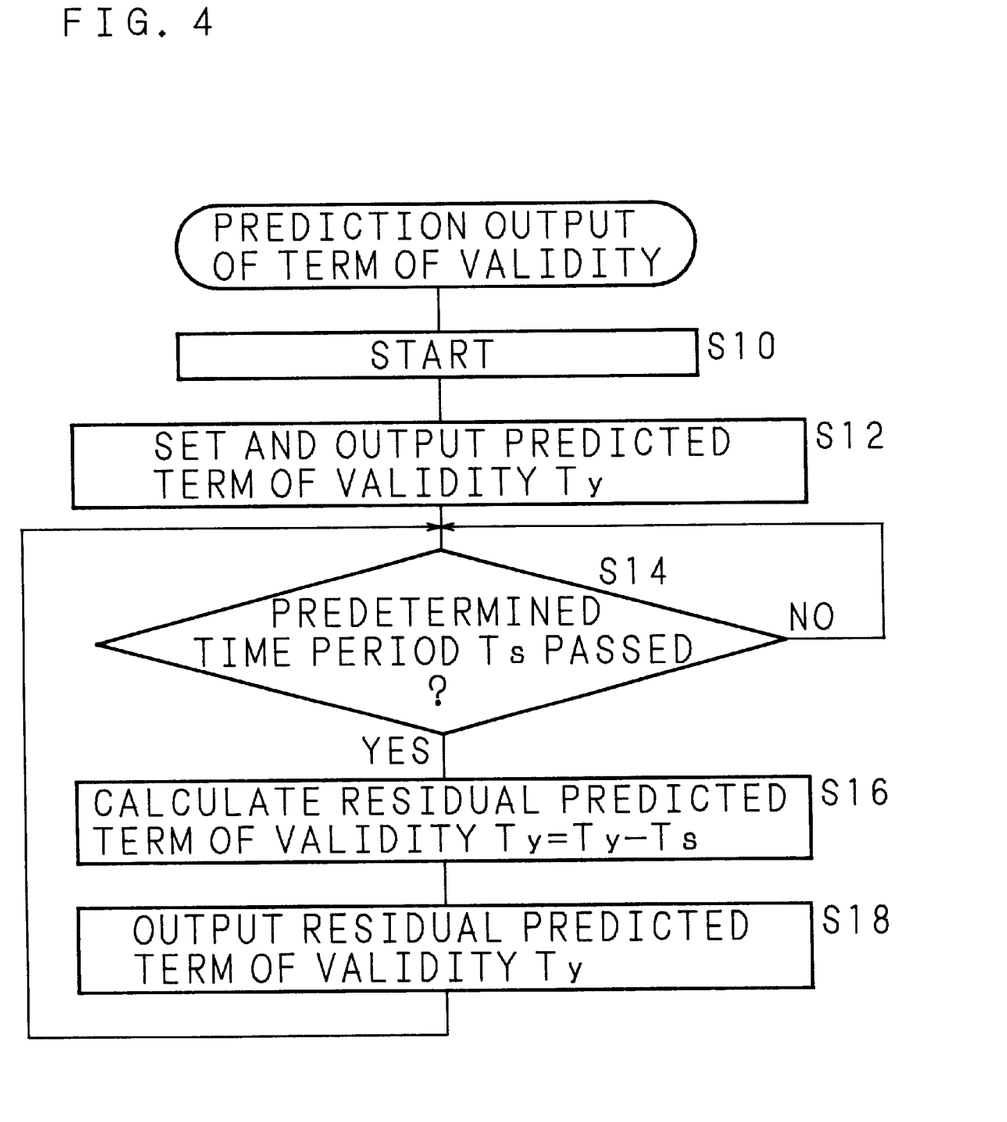
FIG. 4 is a flow chart showing an operation of the timer apparatus of the present invention.

First, the operation relating to prediction for the term of validity on reference to the flow chart in FIG. 4.

When the battery 19 is mounted and a time is set and started (S10), the CPU 22 sets a predicted term of validity Ty of the timer apparatus predicted from the capacity of the battery 19 so as to output the predicted term of validity Ty via the I/O port 24 (S12).

Next, every time a predetermined time period Ts passes (S14), the CPU 22 calculates a residual predicted term of validity Ty (=Ty−Ts) (S16), and outputs the calculated residual predicted term of validity Ty via the I/O port 24 (S18) (seventh aspect).

Figure 5:
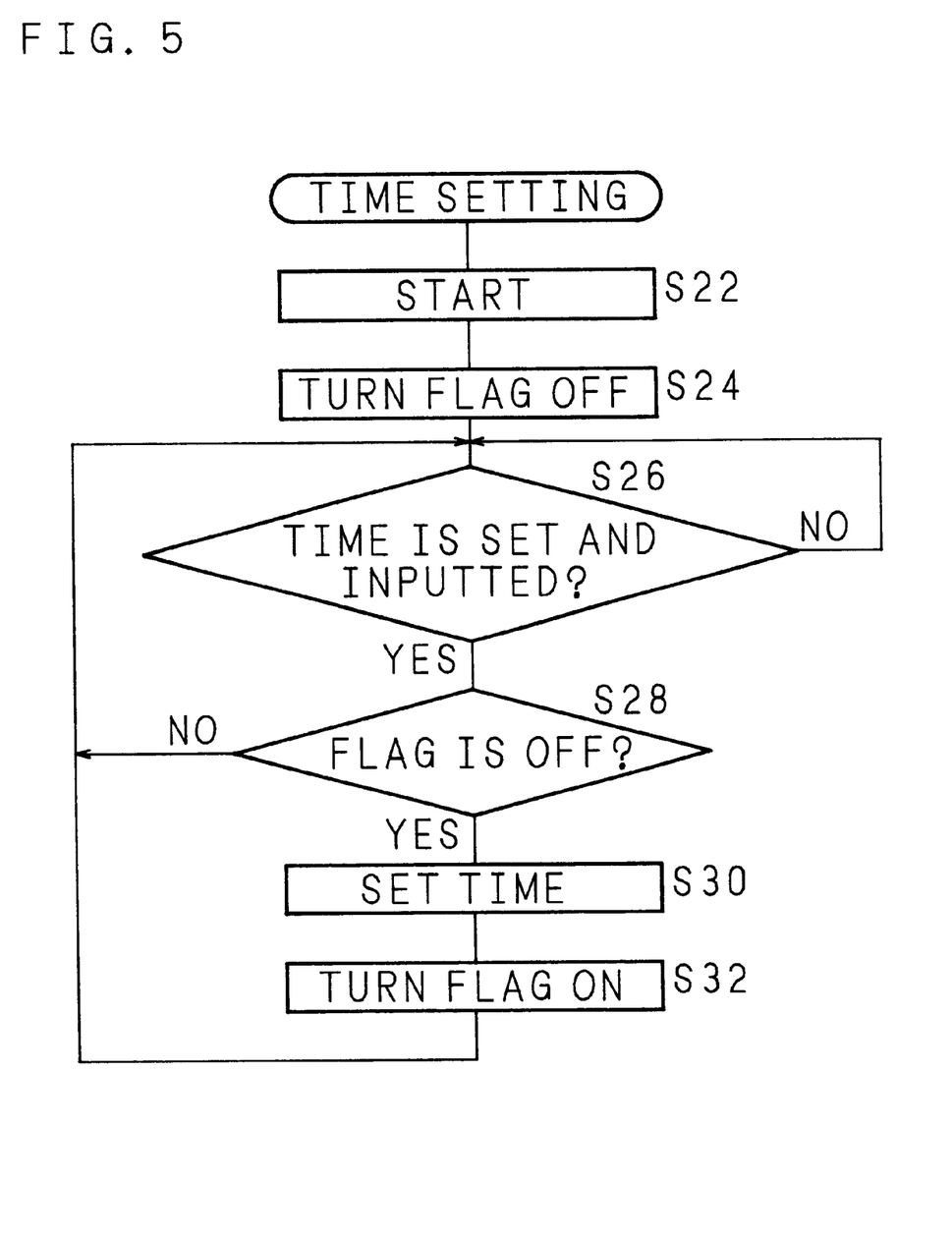
FIG. 5 is a flow chart showing an operation of the timer apparatus of the present invention.

The following describes an operation at the time of setting a time on reference to the flow chart in FIG. 5.

When the battery 19 is mounted and a time is set to be started (S22), the CPU 22 turns off a flag of the flag register 22a (prohibiting means) included in the CPU 22 (S24). In this state, when a time is inputted and set from the time setting terminal 11 (S26), the CPU 22 judges as to whether or not the flag of the flag register 22a is ON (S28). When the judgment is made that the flag is OFF, the CPU 22 sets a time (S30), and turns the flag ON (S32). When the judgment is made that the flag is ON (S28), the CPU 22 does not set the time nor switch the flag into ON/OFF (first and second aspects).

Figure 6:
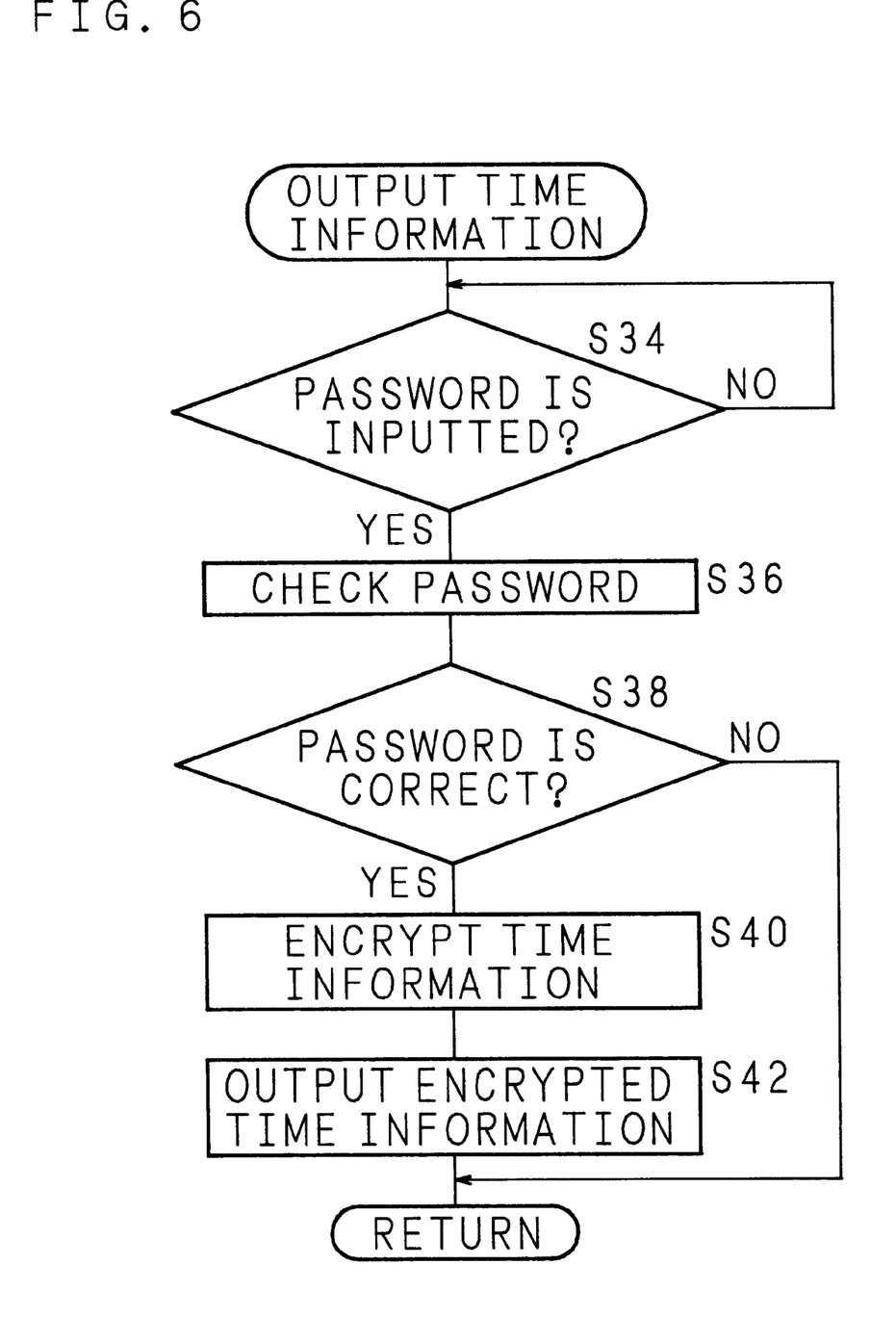
FIG. 6 is a flow chart showing an operation of the timer apparatus of the present invention.

The following describes an operation of outputting the time information on reference to the flow chart in FIG. 6.

When password is inputted via the I/O port 24 (S34), the CPU 22 checks the inputted password (S36). When the checked password is correct (S38), the CPU 22 encrypts the time information by the encrypter 26 (S40), and outputs the encrypted time information (S42) and returns. When the checked password is incorrect (S38), the CPU 22 returns intact (eighth and tenth aspects).

In this case, prior to input of the password (S34), the CPU 22 may generate a password according to an external instruction and output the generated password, and may check the password inputted from the outside (S34) according to the output of the password (S36) (ninth aspect).

Figure 7:
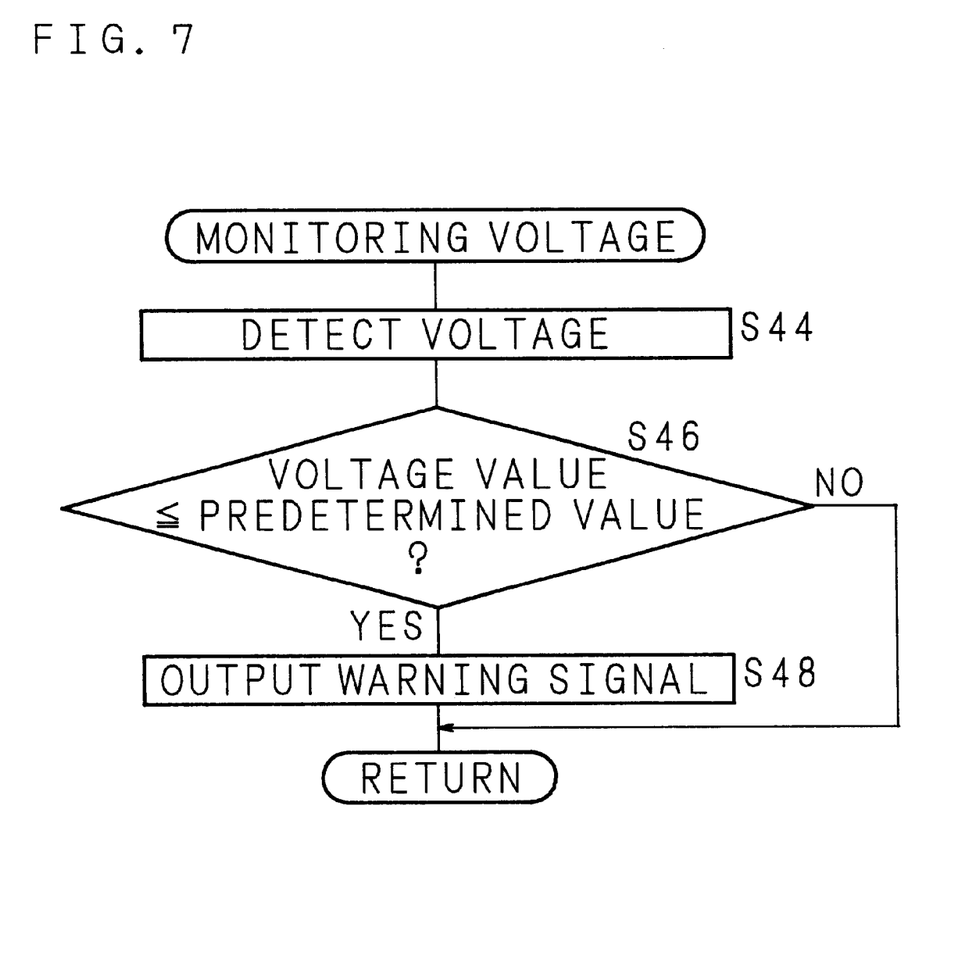
FIG. 7 is a flow chart showing an operation of the timer apparatus of the present invention.

The following describes an operation for monitoring a voltage of the battery 19 on reference to the flow chart in FIG. 7.

The CPU 22 detects a voltage of the battery 19 with a predetermined period (S44), and compares the detected voltage value with a predetermined value (S46). As a result, when the detected voltage value is smaller than the predetermined value, the CPU 22 outputs a signal for warning that the battery 19 is almost dead (S48). When the detected voltage value is larger than the predetermined value, the CPU 22 returns intact (first aspect).

Figure 8:
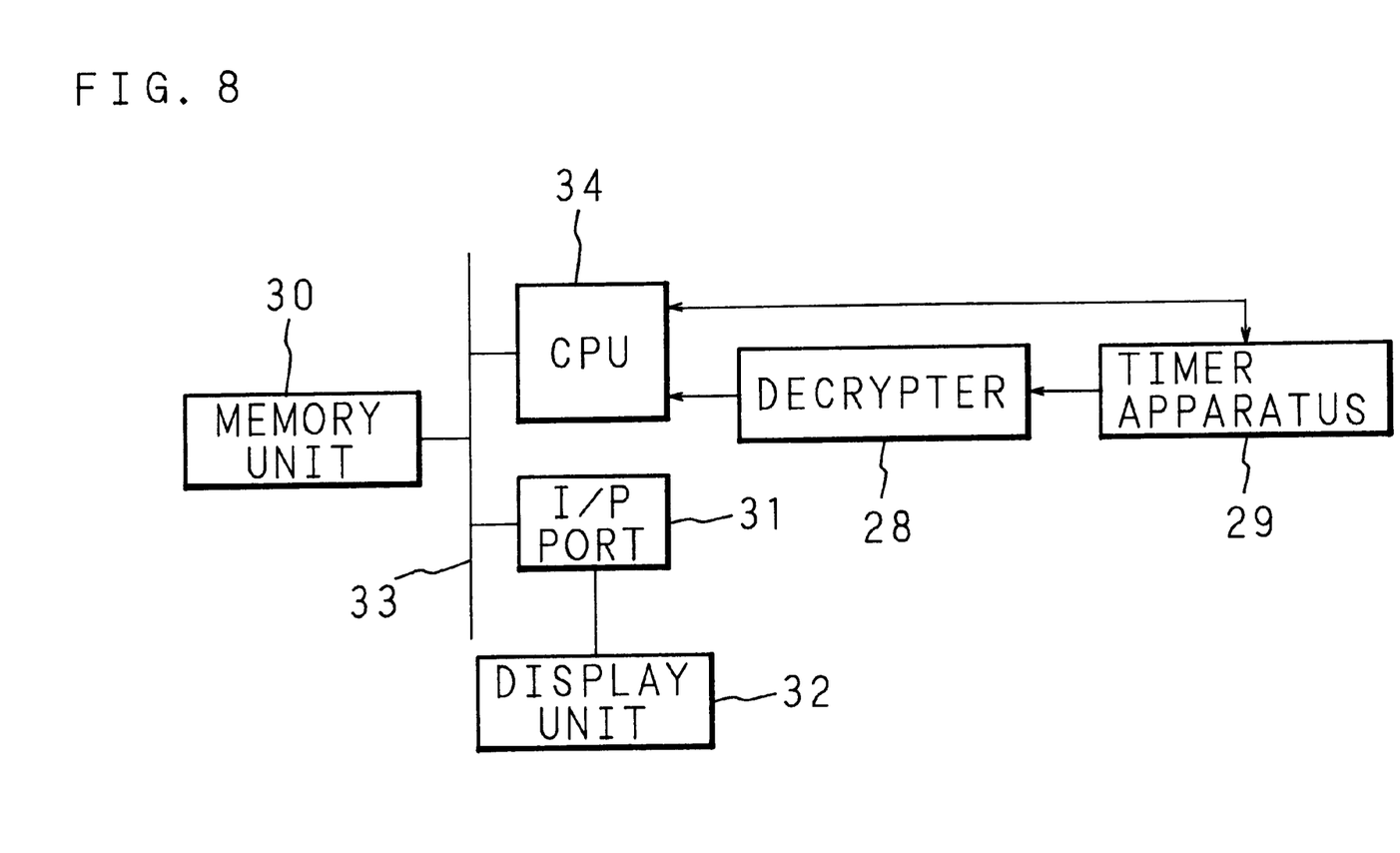
FIG. 8 is a block diagram showing an arrangement of an essential portion of a computer according to an embodiment of the present invention.

FIG. 8 is a block diagram showing the arrangement of an essential portion of a computer according to an embodiment of the present invention. The computer has a CPU 34, I/O port 31 and memory 30 connected with the CPU 34 via a bus 33, a display unit 32 connected with the I/O port 31, the timer apparatus 29 of the present invention, and a decrypter 28 for decrypting encrypted time information obtained by the timer apparatus 29 so as to supply it to the CPU 34.

Figure 9:
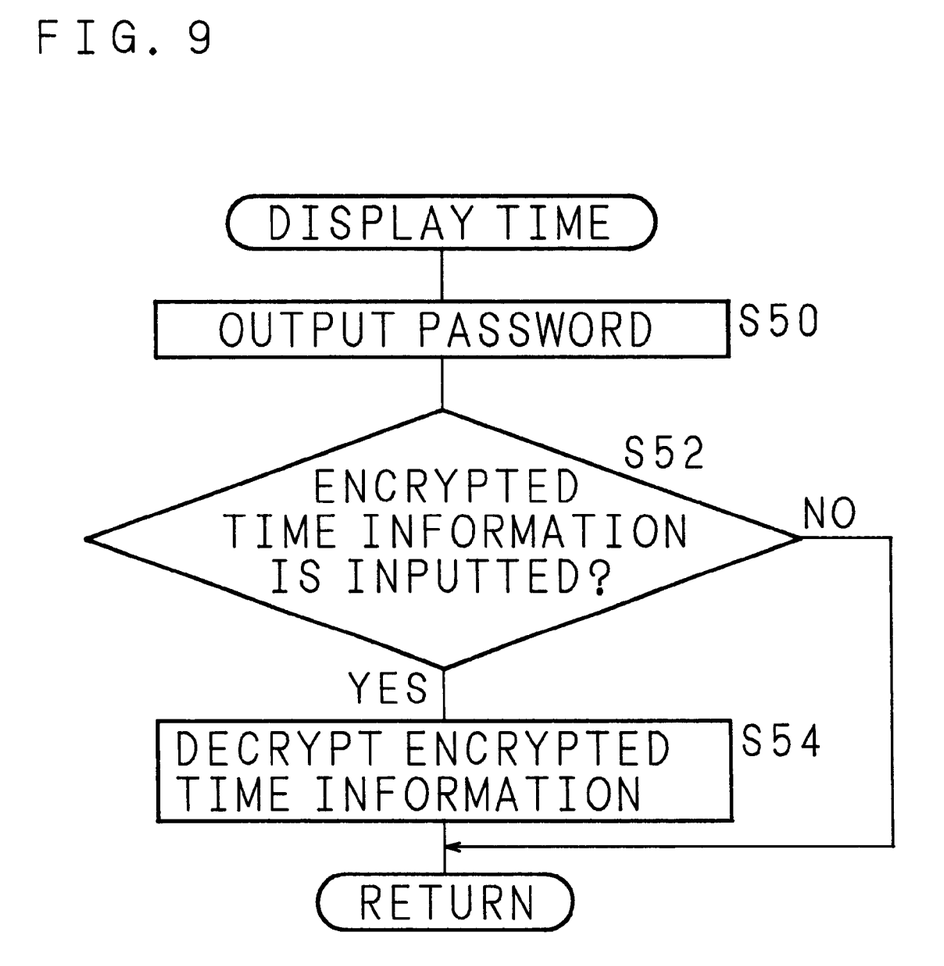
FIG. 9 is a flow chart showing an operation of the computer according to the present invention.

The following describes an operation of the computer having the such an arrangement on reference to the flow chart in FIG. 9.

When displaying a time or outputting time information onto the display unit 32, the CPU 34 directly outputs a predetermined password to the timer apparatus 29 (S50). The timer apparatus 29 checks the inputted password (S36 in FIG. 6), and in the case where a judgment is made that the password is correct (S38 in FIG. 6), when the time information is encrypted to be outputted (S42 in FIG. 6) (S52), the encrypted time information is decrypted by the decrypter 28 (S54), and the decrypted time information is displayed on the display unit 32. Moreover, the time information is printed by a printer (not shown) as the need arises. When the encrypted time information is not inputted from the timer apparatus 29 (S52), the CPU 34 returns intact.

In such the computer, since it is difficult to incorrectly change a time to be outputted, in the case where a remittance system, electronic filing document transmitting system, etc. are constructed, their security is improved greatly.

As mentioned above, according to the timer apparatus of the first through sixth aspects, a low-cost timer apparatus in which a time is not changed illegally can be realized without using a physical self-explosion apparatus and without mounting a processor for performing a complicated process.

According to the timer apparatus of the seventh aspect, since the timer apparatus can be exchanged for a new one until the term of validity is expired, the power source can be mold integrally with the main body of the timer apparatus, and thus incorrect change of a time due to an operation and exchange of the power source can be prevented.

According to the timer apparatus of the eighth and tenth aspects, when the time information which includes ID of the timer apparatus is outputted and a time as well as the ID are printed, reliability of the printed time can be improved.

According to the timer apparatus of the ninth aspect, since a password is not fixed and it is difficult to copy the password, when the time information, which is outputted when the password is accepted, includes the ID of the timer apparatus to be outputted and a time as well as the ID are printed, reliability of the printed time can be improved.

According to the timer apparatus of the eleventh aspect, since before the power source (battery) is dead, the timer apparatus can be exchanged for a new one, the power source can be molded integrally with the main body of the timer apparatus, and thus incorrect change of time due to operation and exchange of the power source can be prevented.

According to the computer of the twelfth aspect, a time outputted by the computer cannot be changed incorrectly.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A timer apparatus, comprising:
   a power source;
   a setting terminal setting a time;
   a write terminal to write a program, a portion of said write terminal being formed as a temperature fuse portion;
   a heating device positioned in the vicinity of said temperature fuse portion, and heated via a heater terminal;

a timer unit, to which a time is set via said setting terminal, outputting time information thereafter based on the set time; and a control unit controlling said timer unit according to a program which is written from the outside via said write terminal, and said control unit permitting set of a time in said timer unit only once; wherein after the program is written to said control unit via said write terminal, said heating device is heated via said heater terminal so that said temperature fuse portion is fused, and said power source, timer unit and control unit are molded integrally.

2. The timer apparatus as set forth in claim 1, wherein said control unit includes:

a predictor predicting a term of validity based on a state of said power source at the time when said power source is connected with said timer apparatus or a time is set in said timer unit;

a calculator calculating a residual term based on the term of validity predicted by said predictor at an arbitrary time thereafter; and an output device outputting the residual term calculated by said calculator to the outside.

3. The timer apparatus as set forth in claim 1, further comprising:

a judging device judging whether or not a password input from the outside coincides with a password which was set initially, wherein said timer unit outputs the time information in response to the judging device judging that both the passwords coincide with each other.

4. The timer apparatus as set forth in claim 1, further comprising:

a password generating device generating a password and outputting it to the outside; and a judging device judging whether or not a password input from the outside coincides with the password output to the outside by said password generating device, wherein said timer unit outputs the time information in response to the judging device judging that both passwords coincide with each other.

5. The timer apparatus as set forth in claim 1, further comprising an encrypting device encrypting the time information outputted by said timer unit and outputting the encrypted time information.

6. The timer apparatus as set forth in claim 1, wherein said control unit includes:

a voltage detector detecting a voltage of said power source;

a comparator comparing a value of voltage detected by said voltage detector with a predetermined value; and a warning device generating a warning signal in response to the comparator determining that the voltage value is smaller than the predetermined value.

7. A timer apparatus, comprising:

a power source;

a setting terminal setting a time, a portion of said setting terminal being formed as a first temperature fuse portion;

a first heater positioned in the vicinity of said first temperature fuse portion, and heated via a first heater terminal;

a write terminal to write a program, a portion of said write terminal being formed as a second temperature fuse portion;

a second heater positioned in the vicinity of said second temperature fuse portion, and heated via a second heater terminal;

a timer unit, to which a time is set via said setting terminal, outputting time information thereafter based on the set time; and a control unit controlling said timer unit according to a program which is written from the outside via said write terminal, wherein after the program is written to said control unit via said write terminal, said second heater is heated via said second heater terminal so that said second temperature fuse portion is fused, and after a time is set in said timer unit via said setting terminal, said first heater is heated via said first heater terminal so that said first temperature fuse portion is fused, and said power source, timer unit and control unit are molded integrally.

8. The timer apparatus as set forth in claim 7, wherein said control unit includes:

a predictor predicting a term of validity based on a state of said power source at the time when said power source is connected with said timer apparatus or a time is set in said timer unit;

a calculator calculating a residual term based on the term of validity predicated by said predictor at an arbitrary time thereafter; and an output device outputting the residual term calculated by said calculator to the outside.

9. The timer apparatus as set forth in claim 7, further comprising:

a judging device judging whether or not a password input from the outside coincides with a password which was set initially, wherein said timer unit outputs the time information in response to said judging device judging that both the passwords coincide with each other.

10. The timer apparatus as set forth in claim 7, further comprising:

a password generator generating a password and outputting it to the outside; and a judging device judging whether or not a password input from the outside coincides with the password outputted to the outside by said password generator;

wherein said timer unit outputs the time information in response to said judging device judging that both the passwords coincide with each other.

11. The timer apparatus as set forth in claim 7, further comprising an encrypting device encrypting the time information outputted by said timer unit and outputting the encrypted time information.

12. The timer apparatus as set forth in claim 7, wherein said control unit includes:

a voltage detector detecting a voltage of said power source;

a comparator comparing a value of voltage detected by said voltage detector with a predetermined value; and a warning device generating a warning signal in response to the comparator determining that the voltage value is smaller than the predetermined value.

13. A timer apparatus, comprising:

a power source;

a setting terminal setting a time;

a write terminal writing a program, a portion of said write terminal being formed as a temperature fuse portion;

a heater positioned in the vicinity of said temperature fuse portion, and is heated via a heater terminal;

a timer unit to which a time is set via said setting terminal, outputting time information thereafter based on the set time; and a control unit controlling said timer unit according to a program which is written from the outside via said write terminal, said control unit permitting set of a time in said timer unit only once, wherein said power source, timer unit and control unit are molded integrally.

14. The timer apparatus as set forth in claim 13, wherein said control unit includes:

a predictor predicting a term of validity based on a state of said power source at the time when said power source is connected with said timer apparatus or a time is set in said timer unit;

a calculator calculating a residual term based on the term of validity predicted by said predictor at an arbitrary time thereafter; and an output device outputting the residual term calculated by said calculator to the outside.

15. The timer apparatus as set forth in claim 13, further comprising:

a judging device judging as to whether or not a password input from the outside coincides with a password which was set initially, wherein said timer unit outputs the time information in response to said judging device judging that both the passwords coincide with each other.

16. The timer apparatus as set forth in claim 13, further comprising:

a password generating device generating a password and outputting it to the outside; and a judging device judging whether or not a password input from the outside coincides with the password outputted to the outside by said password generating device, wherein said timer unit outputs the time information in response to the judging device judging that both the passwords coincide with each other.

17. The timer apparatus as set forth in claim 13, further comprising an encrypting device encrypting the time information outputted by said timer unit and outputting the encrypted time information.

18. The timer apparatus as set forth in claim 13, wherein said control unit includes:

a voltage detector detecting a voltage of said power source;

a comparator comparing a value of voltage detected by said voltage detector with a predetermined value; and a warning device generating a warning signal in response to the comparator determining that the voltage value is smaller than the predetermined value.

19. A timer apparatus, comprising:

a power source;

a setting terminal setting a time, a portion of said setting terminal being formed as a first temperature fuse portion;

a first heater positioned in the vicinity of said first temperature fuse portion, and is heated via a first heater terminal;

a write terminal to write a program, a portion of said write terminal being formed as a second temperature fuse portion;

a second heater positioned in the vicinity of said second temperature fuse portion, and is heated via a second heater terminal;

a timer unit to which a time is set via said setting terminal, outputting time information thereafter based on the set time; and a control unit controlling said timer unit according to a program which is written from the outside via said write terminal, wherein said power source, timer unit and control unit are molded integrally.

20. The timer apparatus as set forth in claim 19, wherein said control unit includes:

a predictor predicting a term of validity based on a state of said power source at the time when said power source is connected with said timer apparatus or a time is set in said timer unit;

a calculator calculating a residual term based on the term of validity predicted by said predictor at an arbitrary time thereafter; and an output device outputting the residual term calculated by said calculator to the outside.

21. The timer apparatus as set forth in claim 19, further comprising:

a judging device judging as to whether or not a password input from the outside coincides with a password which was set initially, wherein said timer unit outputs the time information in response to said judging device judging that both passwords coincide with each other.

22. The timer apparatus as set forth in claim 19, further comprising:

a password generating generator generating a password and outputting it to the outside; and a judging device judging as to whether or not a password input from the outside coincides with the password outputted to the outside by said password generator, wherein said timer unit outputs the time information in response to the judging device judging that both passwords coincide with each other.

23. The timer apparatus as set forth in claim 19, further comprising an encrypting device encrypting the time information outputted by said timer unit and outputting the encrypted time information.

24. The timer apparatus as set forth in claim 19, wherein said control unit includes:

a voltage detector detecting a voltage of said power source;

a comparator comparing a value of voltage detected by said voltage detector with a predetermined value; and a warning device generating a warning signal in response to the comparator determining that the voltage value is smaller than the predetermined value.

25. A computer having a timer apparatus, said timer apparatus comprising:

a power source;

a setting terminal setting a time;

a write terminal writing a program, a portion of said write terminal being formed as a temperature fuse portion;

a heater positioned in the vicinity of said temperature fuse portion, and is heated via a heater terminal;

a timer unit, to which a time is set via said setting terminal, outputting time information thereafter based on the set time; and a control unit controlling said timer unit according to a program which is written from the outside via said write terminal, said control unit permitting set of a time in said timer unit only once, wherein after the program is written to said control unit via said write terminal, said heater is heated via said heater terminal so that said temperature fuse portion is fused, and said power source, timer unit and control unit are molded integrally.

26. A computer having a timer apparatus, said timer apparatus comprising:

a power source;

a setting terminal setting a time, a portion of said setting terminal being formed as a first temperature fuse portion;

a first heater positioned in the vicinity of said first temperature fuse portion, and is heated via a first heater terminal;

a write terminal to write a program, a portion of said write terminal being formed as a second temperature fuse portion;

a second heater positioned in the vicinity of said second temperature fuse portion, and is heated via a second heater terminal;

a timer unit, to which a time is set via said setting terminal, outputting time information thereafter based on the set time; and a control unit controlling said timer unit according to a program which is written from the outside via said write terminal, wherein after the program is written to said control unit via said write terminal, said second heater is heated via said second heater terminal so that said second temperature fuse portion is fused, and after a time is set in said timer unit via said setting terminal, said first heater is heated via said first heater terminal so that said first temperature fuse portion is fused, and said power source, timer unit and control unit are molded integrally.

27. A computer having a timer apparatus, said timer apparatus comprising:

a power source;

a setting terminal setting a time;

a write terminal writing a program, a portion of said write terminal being formed as a temperature fuse portion;

a heater positioned in the vicinity of said temperature fuse portion, and is heated via a heater terminal;

a timer unit to which a time is set via said setting terminal, outputting time information thereafter based on the set time; and a control unit controlling said timer unit according to a program which is written from the outside via said write terminal, said control unit permitting set of a time in said timer unit only once, wherein said power source, timer unit and control unit are molded integrally.

28. A computer having a timer apparatus, said timer apparatus comprising:

a power source;

a setting terminal setting a time, a portion of said setting terminal being formed as a first temperature fuse portion;

a first heater positioned in the vicinity of said first temperature fuse portion, and is heated via a first heater terminal;

a write terminal writing a program, a portion of said write terminal being formed as a second temperature fuse portion;

a second heater positioned in the vicinity of said second temperature fuse portion, and is heated via a second heater terminal;

a timer unit to which a time is set via said setting terminal, outputting time information thereafter based on the set time; and a control unit controlling said timer unit according to a program which is written from the outside via said write terminal, wherein said power source, timer unit and control unit are molded integrally.

* * * * *